(12) United States Patent
Melika et al.

(10) Patent No.: US 10,504,080 B2
(45) Date of Patent: Dec. 10, 2019

(54) CRYPTOGRAPHICALLY MANAGINGTELECOMMUNICATIONS SETTLEMENT

(71) Applicant: OX Labs Inc., Los Angeles, CA (US)

(72) Inventors: George Melika, Los Angeles, CA (US); Akbar Thobhani, South San Francisco, CA (US)

(73) Assignee: OX Labs Inc., Los Angeles, CA (US)

( * ) Notice: Subject to any disclaimer, the term of this patent is extended or adjusted under 35 U.S.C. 154(b) by 288 days.

(21) Appl. No.: 14/853,879

(22) Filed: Sep. 14, 2015

(65) Prior Publication Data
US 2017/0078493 A1   Mar. 16, 2017

(51) Int. Cl.
| | | |
|---|---|---|
| G06Q 20/14 | (2012.01) | |
| H04M 15/00 | (2006.01) | |
| G06Q 20/36 | (2012.01) | |
| H04L 29/06 | (2006.01) | |
| H04W 4/16 | (2009.01) | |

(52) U.S. Cl.
CPC .......... *G06Q 20/145* (2013.01); *G06Q 20/36* (2013.01); *H04L 63/123* (2013.01); *H04M 15/48* (2013.01); *H04M 15/60* (2013.01); *H04W 4/16* (2013.01)

(58) Field of Classification Search
CPC .............................. G06Q 20/145; G06Q 20/36
See application file for complete search history.

(56) References Cited

U.S. PATENT DOCUMENTS

| | | | | |
|---|---|---|---|---|
| 5,557,518 A * | 9/1996 | Rosen | ..................... | G06Q 20/02 235/375 |
| 5,995,822 A * | 11/1999 | Smith | ................. | H04M 15/775 455/406 |
| 6,950,407 B1 * | 9/2005 | Huddle | ................... | H04L 12/14 370/254 |
| 7,440,922 B1 * | 10/2008 | Kempkes | ............... | G06Q 20/04 705/39 |
| 9,219,824 B1 * | 12/2015 | Harper | .................. | H04M 15/67 |
| 2002/0128983 A1 * | 9/2002 | Wrona | ................... | G06Q 20/02 705/71 |

(Continued)

OTHER PUBLICATIONS

Satoshi Nakamoto; Bitcoin: A Peer-to-Peer Electronic Cash System; Retrieved Jul. 4, 2010 from https://web.archive.org/web/20100704213649/http://www.bitcoin.org/bitcoin.pdf.*
Hearrn et al., Bitcoinj Working with the wallet, retrieved on https://web.archive.org/web/20150423041507/https://bitcoinj.github.io/working-with-the-wallet (Year: 2105).*
BitcoinWiki, retrieved on Aug. 23, 2015 from https://web.archive.org/web/20150823175352/https://en.bitcoin.it/wiki/Contract. Example 7 (Year: 2015).*

(Continued)

*Primary Examiner* — Zeshan Qayyum
*Assistant Examiner* — Eduardo Castilho
(74) *Attorney, Agent, or Firm* — Cognition IP, P.C.; Edward Steakley (57) ABSTRACT

Described is cryptographically managed telecommunications settlement occurring in real time with generation and termination of a telecommunications channel. Upon the generation of a communications channel, a contract fund is established between two or more telecommunications services and recorded on a cryptographic ledger. Over the course of regular intervals of channel service, cryptocurrency is released from the contract fund. Upon termination of the communications channel, the released amount of the contract fund is transferred to the receiving provider telecommunications, the remainder back to the requesting telecommunications service. Transactions between cryptocurrency wallets are all published to the cryptographic ledger.

6 Claims, 6 Drawing Sheets

(56) References Cited

U.S. PATENT DOCUMENTS

| | | | | |
|---|---|---|---|---|
| 2002/0156729 | A1* | 10/2002 | Nilson | G06Q 20/102 705/40 |
| 2008/0040146 | A1* | 2/2008 | Rogovin | G06Q 30/06 705/80 |
| 2013/0238903 | A1* | 9/2013 | Mizunuma | G06F 21/31 713/176 |
| 2014/0164765 | A1* | 6/2014 | Hernandez Encinas | H04L 9/3255 713/156 |
| 2015/0189024 | A1* | 7/2015 | Misra | H04L 67/141 709/205 |
| 2015/0206106 | A1* | 7/2015 | Yago | G06Q 20/0658 705/68 |
| 2015/0262137 | A1* | 9/2015 | Armstrong | G06Q 20/065 705/41 |
| 2015/0287026 | A1* | 10/2015 | Yang | G06Q 20/3678 705/69 |
| 2016/0092988 | A1* | 3/2016 | Letourneau | G06Q 40/06 705/66 |
| 2016/0292672 | A1* | 10/2016 | Fay | G06Q 20/363 |
| 2016/0292680 | A1* | 10/2016 | Wilson, Jr. | G06Q 20/02 |

OTHER PUBLICATIONS

Hearn et al., Bitcoinj Introduction, retrieved on Jul. 6, 2015 from https://web.archive.org/web/20150706054834/https://bitcoinj.github.io/ (Year: 2015).*

Hearrn et al., Bitcoinj Working with the wallet, retrieved on Jul. 5, 2015 from https://web.archive.org/web/20150705235045/https://bitcoinj.github.io/working-with-micropayment, 2015 (Year: 2015).*

Hearn et al., Bitcoinj Release notes, retrieved on Jun. 23, 2015 from https://web.archive.org/web/20150623025749/http://bitcoinj.github.io:80/release-notes (Year: 2015).*

Hearrn et al., Bitcoinj Working with the wallet, retrieved on https://web.archive.org/web/20150423041507/https://bitcoinj.github.io/working-with-the-wallet (Year: 2015).*

Faradam, bitcoin micropayments tool, [website] Smart Contracts Solutions, Inc., 2013-2015, 5 pages, [retrieved on Oct. 5, 2015], Retrieved from the Internet: <https://faradam.com/>.

Streamium, Decentralized trustless video streaming using bitcoin payment channels [online] GitHub, Inc. 2015, 3 pages, [retrieved on Sep. 23, 2015], Retrieved from the Internet:<https://github.com/streamium/streamium>.

* cited by examiner

CRYPTOGRAPHICALLY MANAGING TELECOMMUNICATIONS SETTLEMENT

TECHNICAL FIELD relates to providing real-time settlement to telecommunications providers.

BACKGROUND

To make and receive phone calls between members of multiple telecommunications services, the calling service opens a channel with the receiving telecommunications service. The channel enables one or more calls between users of each telecommunications service. For accepting the channel and supporting the operation thereof, the calling telecommunications service pays the receiving telecommunications service.

The bills for operating the service are settled on a monthly basis. This is a time consuming process. Additionally, a monthly billing cycle creates substantial barriers to entry to the telecommunications industry because newcomers are often requested to front substantial sums of money as a "retainer" for the month.

DETAILED DESCRIPTION

Telecommunications services employ a channel monitor which keeps track of time used in a communications channel. Multiple callers may use the same communications channel so long as the all callers are attempting to reach parties on the same receiving service. In some embodiments, a communication channel is established for a single caller within a single call. The channel monitor establishes a communications contract and cryptocurrency wallets to manage the payment for the communications channel. An initial amount of cryptocurrency is published to a cryptographic ledger to fund the communications contract.

The receiving service initializes the channel and the channel monitor monitors the service. At regular intervals, such as every minute, the channel monitor generates new a partially signed payment transaction for the interval from the calling service's cryptocurrency wallet. The channel monitor further assures the receiving service that sufficient funds exist to continue service. Upon termination of service in the communications channel, the channel monitor facilitates the signing of the last generated payment transaction, and transfers the deducted amount to the receiving service. The transfer is published on the cryptographic ledger.

Figure 1:
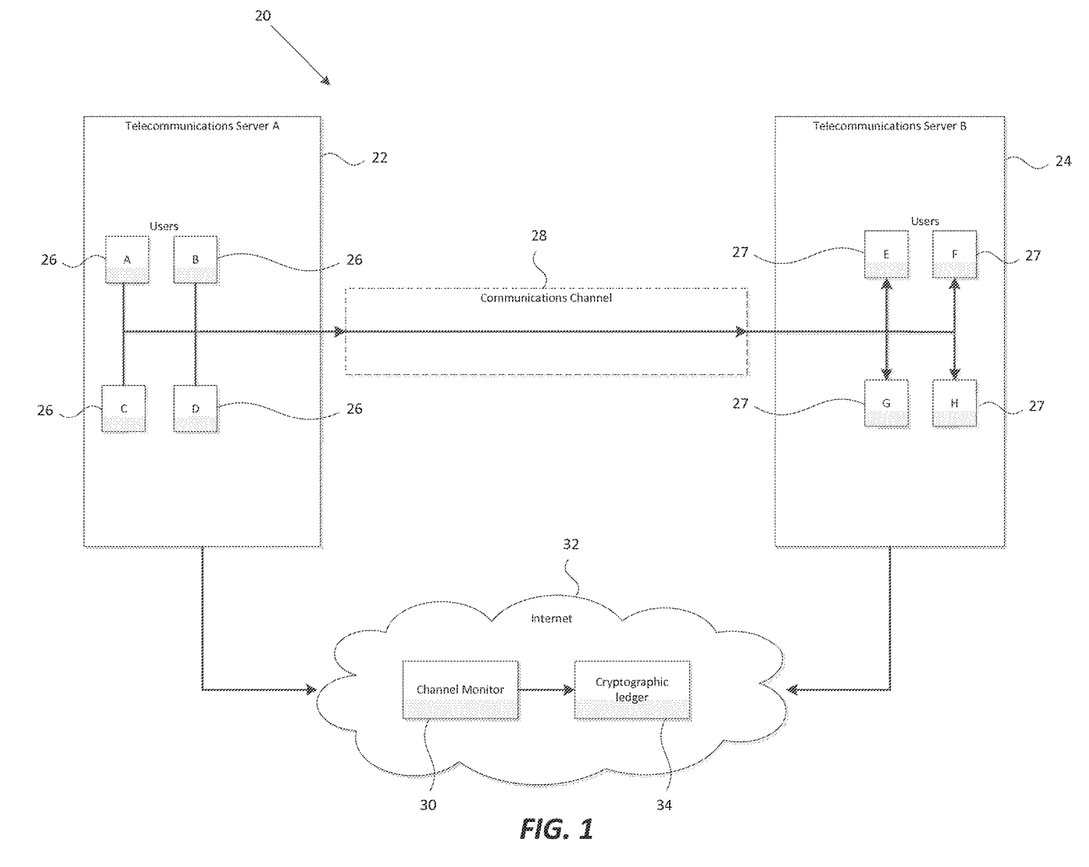
FIG. 1 is an illustrative block diagram of a telecommunications channel monitored and settled with a cryptographic ledger, according to various embodiments.

FIG. 1 is an illustrative block diagram of a telecommunications channel monitored and settled with a cryptographic ledger, according to various embodiments. The settlement system 20 includes two telecommunications servers—server A 22, and server B 24. In practice, there may be a large plurality of telecommunications servers 22, 24; however, for the system to function there only need be two. The telecommunications servers 22, 24 correspond to telecommunications services, these services facilitate telephone and cellular connections for customers, or users. Displayed, users A-D 26 are customers of the first service and are placing calls supported by server A 22, whereas users E-H 27 are customers of the second service and are receiving calls supported by server B 24.

In order to facilitate communication for associated users A-D 26, server A 22 requests a communications channel 28 ("channel") with server B 24. The channel 28 is opened in response to calling requests made by users A-D 26. The channel 28 is further monitored for use. In some embodiments, a single caller uses a channel (ex: user A 26 contacts user E 27). In other embodiments a plurality of users 26 call a plurality of other users 27 using the same channel 28 (ex: user A 26 contacts user E 27, user B 26 contacts user F 27, user C 26 contacts user G 27, and user D 26 contacts user H 27).

Server A 24 and server B 26 are in communication with a channel monitor 30 through the Internet 32. Using direct reporting from each server 22, 24, the channel monitor 30 keeps track of the extent and length of usage of the channel 28 by server A 22. The channel monitor 28 further reports to a cryptographic ledger 34. The cryptographic ledger is a distributed ledger for recording transactions of an associated cryptocurrency. In some embodiments, the cryptocurrency used is Bitcoin and the cryptographic ledger is the Blockchain. However, other suitable cryptocurrencies and cryptographic ledgers can be used.

Figure 2:
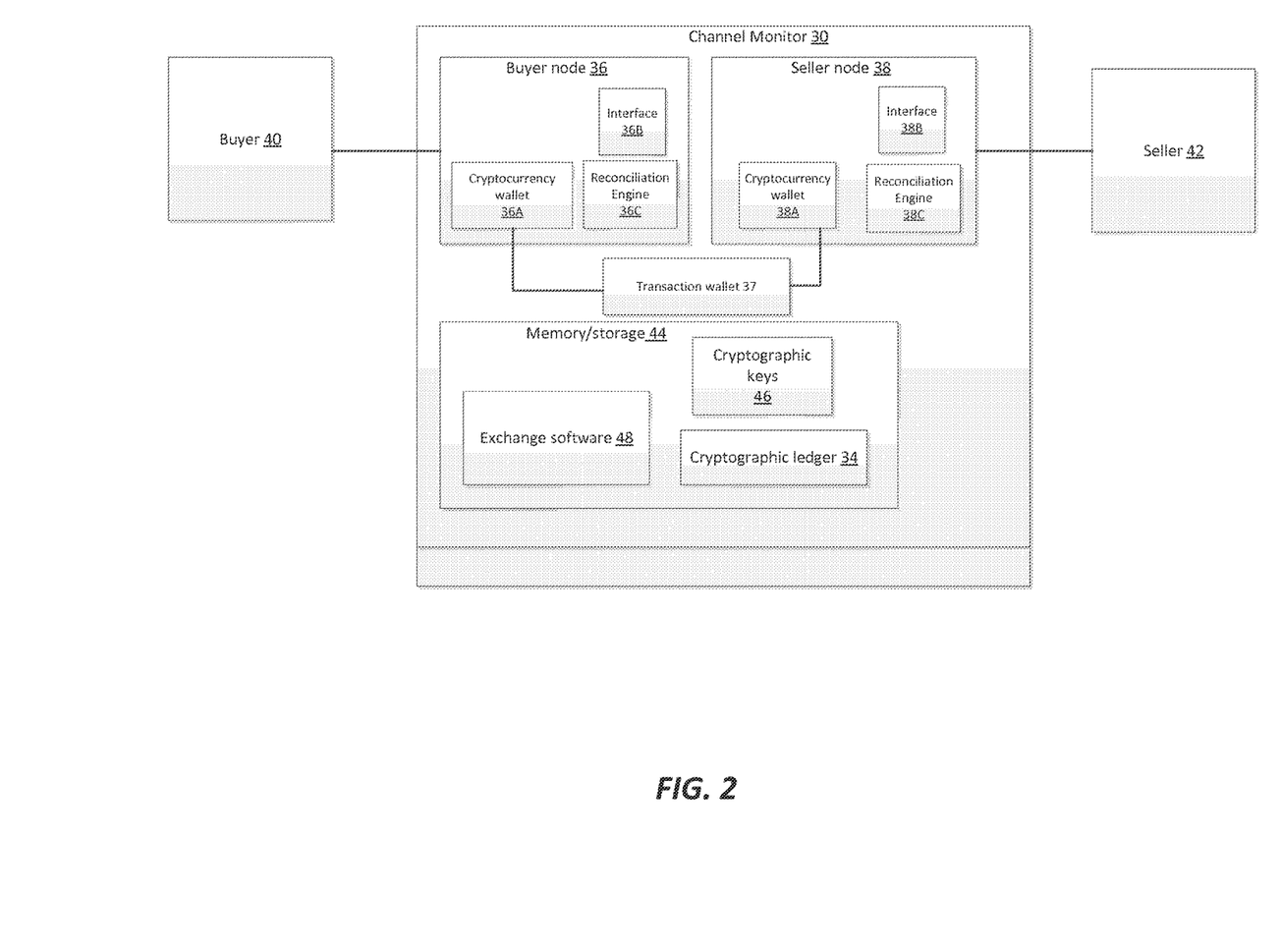
FIG. 2 is a block diagram of a channel monitor, according to various embodiments.

FIG. 2 is a block diagram of a channel monitor 30, according to various embodiments. The channel monitor 30 is modular and can be thought of as either software (ex: an API) or a combination of hardware and software components. While software components are supported by hardware components such as web servers, network communication cards, memory and digital data storage, these components do not necessarily have to reside on the same device. the channel monitor 30 can utilize both a distributed and a central system architecture.

The channel monitor 30 includes both a buyer node 36 and a seller node 38. Each of these nodes 36, 38 may comprise a separate server, a communications port in a single server, or identifiable software components. The term "node" in this context is includes the word "module" where appropriate based on context. Each node 36, 38 serves the primary communication terminal for the buyer of telecommunications services ("buyer") 40, and the seller of telecommunications services ("seller") 42. The buyer 40 corresponds with server A 22, and the seller 42 corresponds with server B 24.

Depicted in FIG. 2 are only a single buyer node 36 and single seller node 38; however, in some embodiments, there are a plurality of nodes each corresponding to a different telecommunications service. The labels "buyer" and "seller" are provided in this diagram for convenience and ease of reading—in practice, nodes change label based upon which users 26 are making calls to what other users 27. Configurations exist where a channel 28 facilitates communications in both directions from a given pair of telecommunications services and settlement of payment is merely offset at the termination of the channel 28.

In some embodiments, the channel monitor communicates only with a single telecommunications server. On the seller side is a middleman entity whom has acquired ownership of intervals of telecom service from a plurality of telecom service providers. This middleman is referenced in the claims as a "minute merchant." Minute merchants aggregate intervals of telecom services over multiple service providers and thus a buyer of telecom service need only deal with the minute merchant for reaching users of a plurality of telecom service providers rather than deal with each telecom service provider individually.

Each node 36, 38 has at least one associated cryptocurrency wallet 36A, 38A. Cryptocurrency wallets are represented by public/private key pairs stored in a memory or storage 44. Cryptographic keys 46 are the primary way to distinguish ownership of a given cryptocurrency wallet. What is stored in a cryptocurrency wallet is the summation of all transactions associated with the cryptocurrency wallet's public key. Knowledge, or possession of a private cryptographic key enables one to full access of the cryptocurrency stored in the cryptocurrency wallet. Some embodiments, the channel monitor further includes a transaction wallet 37. The transaction wallet 37 is created in response to the opening of a channel and is a multi-signature wallet requiring two or more private keys to enables transactions. Private keys for the transaction wallet 37 are held by the channel monitor on behalf of the buyer 40 and seller 42. Additional private keys may be held by the channel monitor for escrow services, middlemen, or other interested third parties.

Transactions of cryptocurrency are made using cryptocurrency wallet software 48. In some embodiments, use of a cryptocurrency exchange software 48 additionally includes a full and current copy of the cryptographic ledger 34 that supports the chosen cryptocurrency. In other embodiments, the channel monitor 30 does not include a copy of the cryptographic ledger 34, or alternatively, the channel monitor 30 includes only a selected portion of the cryptographic ledger 34, sometimes referred to as a "sidechain." In some embodiments selected portions of the cryptographic ledger 34 is referred to as simple payment verification or SPV.

Accordingly, the buyer node 36 and the seller node 38 each include cryptocurrency wallets 36A, 38A. Where the transmission of documents is necessary, the nodes 36,38 provide an interface 36B,38B for the buyer 40 and the seller 42. Each node 36,38 further includes a reconciliation engine 36C,38C. The reconciliation engine 36C, 38C compares channel usage data provided by server A 22 and server B 24 reconciles the use with the cost of use and facilitates transactions with the exchange software 48.

The reconciliation engine is further enabled to find the facilitated transactions on the cryptographic ledger 34 and present the stored transaction data on the ledger to the buyer 40 or seller 42. In some embodiments, the reconciliation engine presents the data in a human readable/user friendly way. In other embodiments, the raw data is presented to the buyer 40 or seller 42 to make use of as each sees fit.

Figure 3:
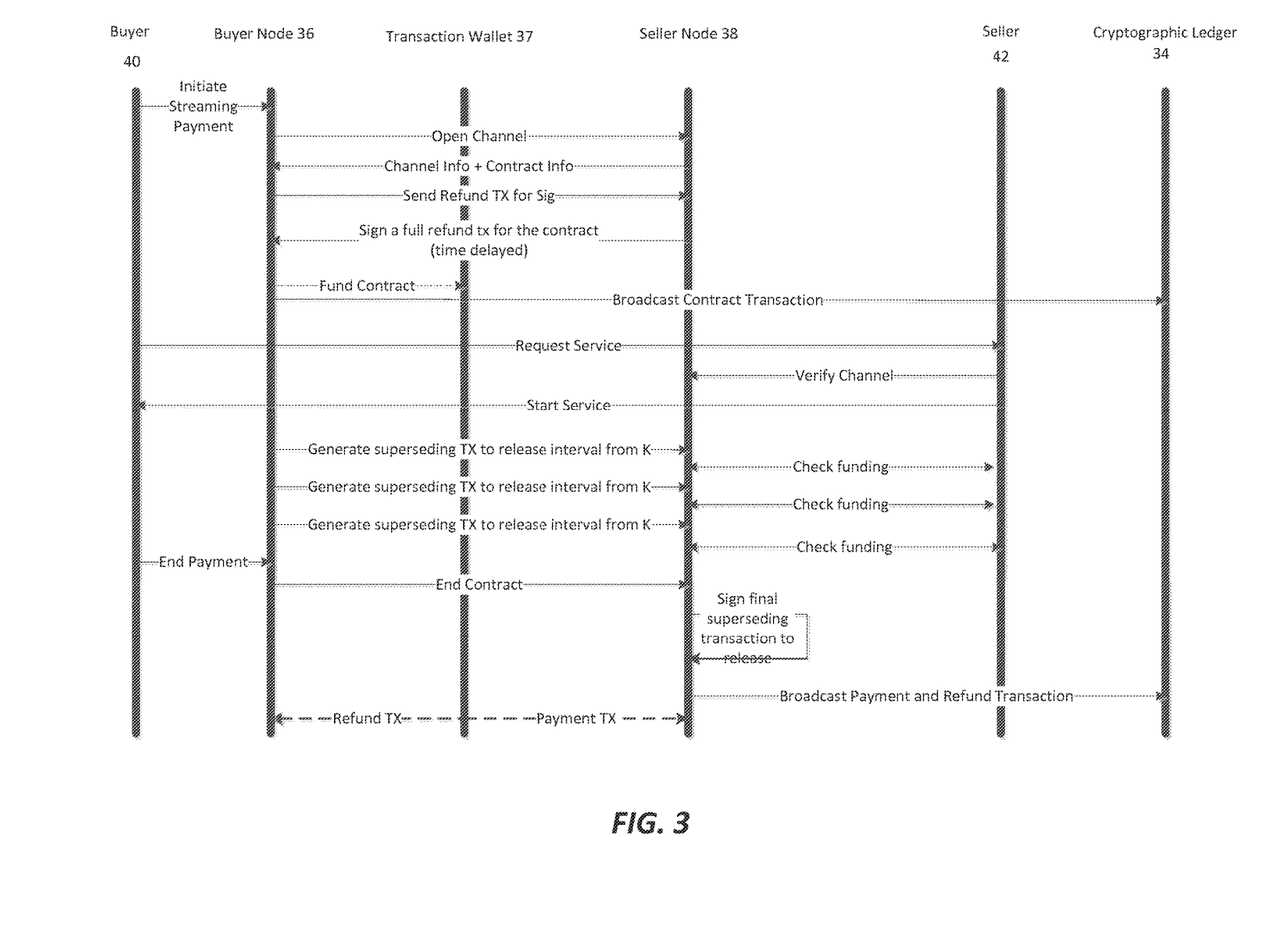
FIG. 3 is a time-entity flowchart depicting actions taken to perform real-time settlement of telecommunications channels, according to various embodiments.

FIG. 3 is a time-entity flowchart depicting actions taken to perform real-time settlement of telecommunications channels, according to various embodiments. The flowchart proceeds with entities mapped horizontally and time vertically. Time progresses from top to bottom. Solid step lines indicate the passing of data, whereas dashed lines indicate the transfer of cryptocurrency.

Initially, the buyer 40 contacts the buyer node 36 to indicate a desire to open a channel with the seller 42 and provides necessary financial information to provide the buyer node 36 with sufficient cryptocurrency. Then, the buyer node 36 communicates with the seller node 38 to open a channel 28. The seller node 38 then provides the contract rates for the channel 28 to the buyer node 36. Included with the contract rates for the channel is a public address for the cryptocurrency wallet to use for payments. In some embodiments, the public address shared is for the sell node cryptocurrency wallet 38A, in others the public address shared is that of the transaction wallet 37. In still other embodiments, both the seller node cryptocurrency wallet 38A and the transaction wallet 37 public addresses are shared.

The buyer node 36 returns a signed contract and sends a refund transaction request. The refund transaction request refers to a time locked cryptographic transaction set to execute at a proposed time in the future assuming the transaction is not superseded. Time locked transactions are not published until the designated time for execution. If no changes occur before the designated time, the time-locked transaction is processed as normal. Accordingly, should channel use not occur, the buyer is refunded for the whole contract fund at the designated time. The seller node 38 signs the refund transaction.

The buyer node 36 generates and signs a transfer of cryptocurrency from the buyer's cryptocurrency wallet 36A to the transaction wallet 37. This transfer to the transaction wallet 37 comprises the contract fund. The contract fund is published to the cryptographic ledger 34. In some cases, data from the cryptographic ledger is not user friendly, thus reading may be difficult. In some embodiments, the channel monitor is configured to pull data from the cryptographic ledger and display the data in a user friendly GUI to the buyer 40 and the seller 42.

The cryptocurrency transferred in the funding transaction is used to settle the cost of operating the channel 28. The contract fund is held by the transaction wallet 37 which is a cryptocurrency wallet. In some embodiments, the above steps occur automatically, and in a very short time span of a few seconds or less (depending on latency) upon the initial request to initiate payment for a channel 28. Each node includes predetermined contract preferences for each associated telecommunications service. Contracts for channel use may be standardized for ease of use and efficiency.

In embodiments with custom contracts, the above process may include an additional step where the custom contract is encoded into a transaction on the cryptographic ledger, thereby memorializing the contract.

Once the contract established between the buyer 40 and seller 42, the buyer 40 requests the initialization of service. The seller 42 verifies the channel 28 with the seller node 38, then begins service. The channel monitor 30 then monitors the usage of the channel 28. Through regular intervals, such as minutes, the buyer node 36 notifies the seller node 38 that the seller 42 is entitled to progressively larger amounts of the contract fund. At each interval the buyer node 36, through the associated cryptocurrency wallet 36A, generates and signs a superseding transaction for the refund transaction. The superseding transaction, like the refund transaction is associated with the transaction wallet 37, and thus requires multiple signatures.

The first of the superseding transactions amends the refund transaction to deliver the first time interval's payment to the cryptocurrency wallet 38A associated with the seller node 38, and return the remainder to the buyer 40. This process of creating superseding transactions signed only by the buyer node 36 occurs at each interval and the amount of cryptocurrency transferred to the seller cryptocurrency wallet 38A with each superseding transaction increases per interval, thereby reducing the amount refunded to the buyer cryptocurrency wallet 36A. The specifics of the superseding transactions are determined by the reconciliation engines 36C, 38C. The buyer side reconciliation 36C determines how the contract fund is split, whereas the seller side reconciliation engine 38C determines whether to sign the current transaction.

Additionally, at the regular interval, the seller 42 verifies with the transaction wallet 37 that sufficient funds exist for an additional interval. This verification process may exist as either a push or pull notification. Accordingly, the seller node 38 may also provide notifications to the seller 42 that service of the channel 28 should continue. In some embodiments, where the seller node 38 is instanced on server B 24, neither a push or pull notification to check funding is necessary.

At the termination of required usage, the buyer 40 indicates to the buyer node 36 to terminate the session. The buyer node 36 in turn provides notification to the seller 42 to end service. Upon the ending of the service, the seller side reconciliation engine 38C directs the seller node 38 to sign the most recent superseding transaction. Upon the final superseding transaction having all signatures required for processing, the contract fund is divided into payment and refund and delivered. Further, both the payment and refund transactions are published to the cryptographic ledger 34.

FIG. 3 illustrates a single channel transaction. Embodiments include many channel transactions occurring simultaneously. The many transactions exist over a plurality of telecommunications services as needed. When each channel 28 terminates, the payment settlement occurs, and no processing and reconciliation is required at the end of the month.

The labels provided in FIG. 3 identify a "buyer" and "seller," and are merely for convenience and ease of understanding. In use, both parties, the buyer and the seller, may partake in both purchase and sale of telecom services. In such a case the superseding transactions at each interval vary in value. Where service offsets for a given interval, there is no need to issue a new superseding transaction. Where the "seller" actually purchases more telecom services than the "buyer" in a given interval, the refund transaction is increased and the payment transaction is reduced.

Figure 4:
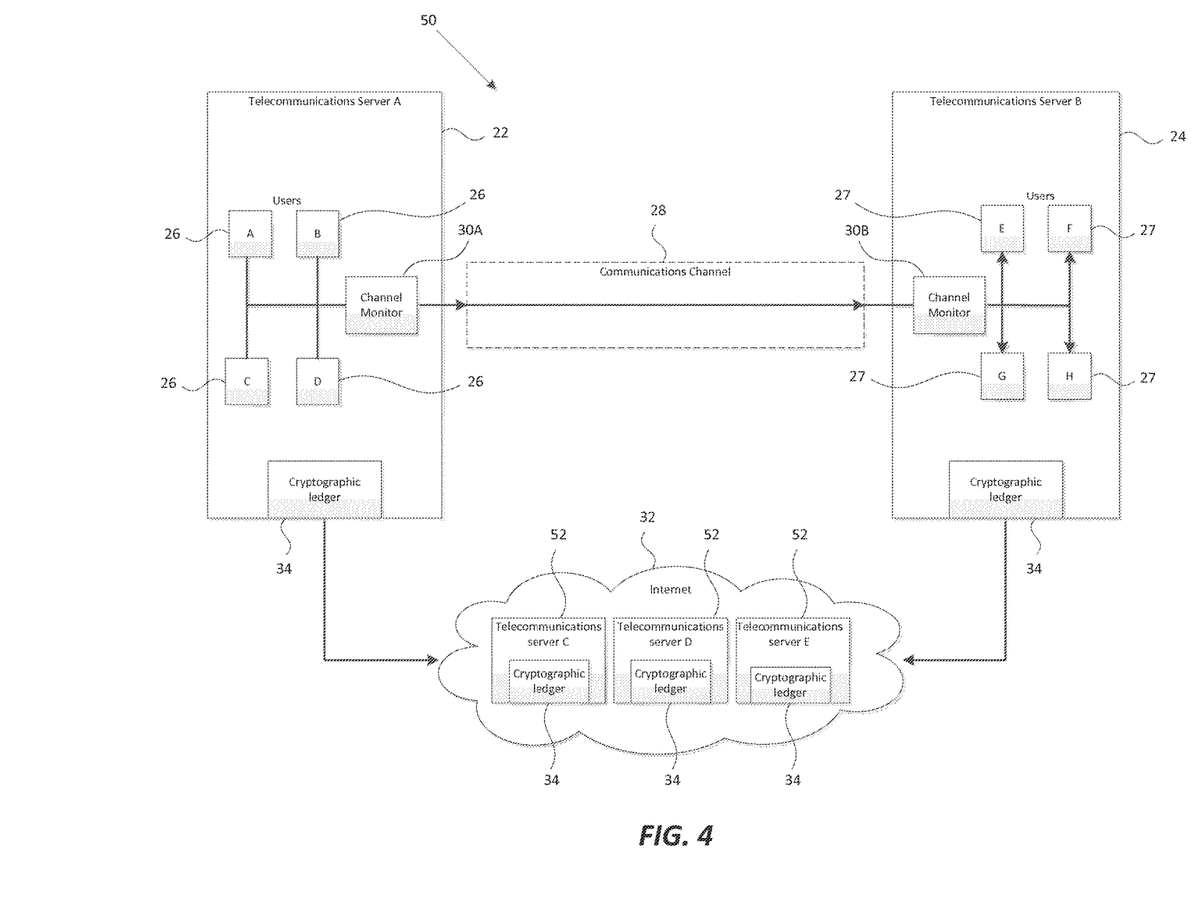
FIG. 4 is an illustrative block diagram of a telecommunications channel monitored and settled with a cryptographic ledger hosted by a plurality of telecommunications servers, according to various embodiments.

FIG. 4 is an illustrative block diagram of a telecommunications channel monitored and settled with a cryptographic ledger hosted by a plurality of telecommunications servers, according to various embodiments. FIG. 4 depicts an alternate system 50 including distinct system alternatives from the system 20 depicted in FIG. 1. First, the channel monitor 30 exists as part of each telecommunications server 22, 24. Second, the cryptographic ledger, and by extension the entire cryptocurrency network, is maintained on a distributed network of telecommunications servers. Other distinctions exist and are apparent from the figure.

When the channel monitor 30 is instanced on both telecommunications servers 22, 24 to a channel transaction, the components within a given instance do not include all components of the channel monitor 30 as pictured in FIG. 2. For example, the buyer node 36A is in the channel monitor 30A associated with Server A 22, and the seller node 38A is in the channel monitor 30B associated with Server B 24. The memory/storage 44 is the digital storage associated with each respective server 22, 24. Private cryptographic keys 46 are only those keys associated with the associated cryptocurrency wallet 36A, 38A.

In this embodiment, the distinction between the instances of the channel monitor 30A, 30B and the respective buyer 40 and seller 42 are narrowed. In some embodiments the channel monitor 30A, 30B is an API implemented by the buyer 40 and seller 42 on Server A 22 and server B 24 respectively. Again, the labelling distinction between "buyer" and "seller" is merely illustrative. In subsequent or even simultaneous transactions the labels may be reversed such that the "buyer" becomes the "seller" and vice-versa.

Further depicted, is a cryptographic ledger supported by a plurality of telecommunications servers. Embodiments of cryptographic ledgers are supported by distributed networks. The Blockchain associated with Bitcoin is supported by thousands of nodes. These nodes each have a full copy of the Blockchain and leave port 8333 open for incoming requests. Where transactions occur between two or a small group of parties, the other nodes that support the ledger/network are not involved in a given transaction, yet still maintain the records of that transaction for security purposes.

FIG. 4 includes uninterested telecommunications servers ("uninterested servers") 52. The uninterested servers 52 act as nodes for the cryptographic ledger 34 and each communicate with a channel monitor (either as a distinct network entity, or instanced in each of the servers 22, 24, 52). The term "uninterested" server 52 is an illustrative label. The uninterested servers 52 are merely uninterested in the subject transaction of FIG. 4, each may be conducting transactions with channels 28 of their own. With respect to those transactions, server A 22, and server B 24 are "uninterested." Given enough uninterested servers 52 as nodes, the alternate system 52 is enabled to make use of a private cryptocurrency (as opposed to a public cryptocurrency like Bitcoin, Ripple, Dash, or other suitable public cryptocurrencies). A private cryptocurrency used exclusively by the telecommunications network has the benefits of a fixed exchange rate.

Figure 5:
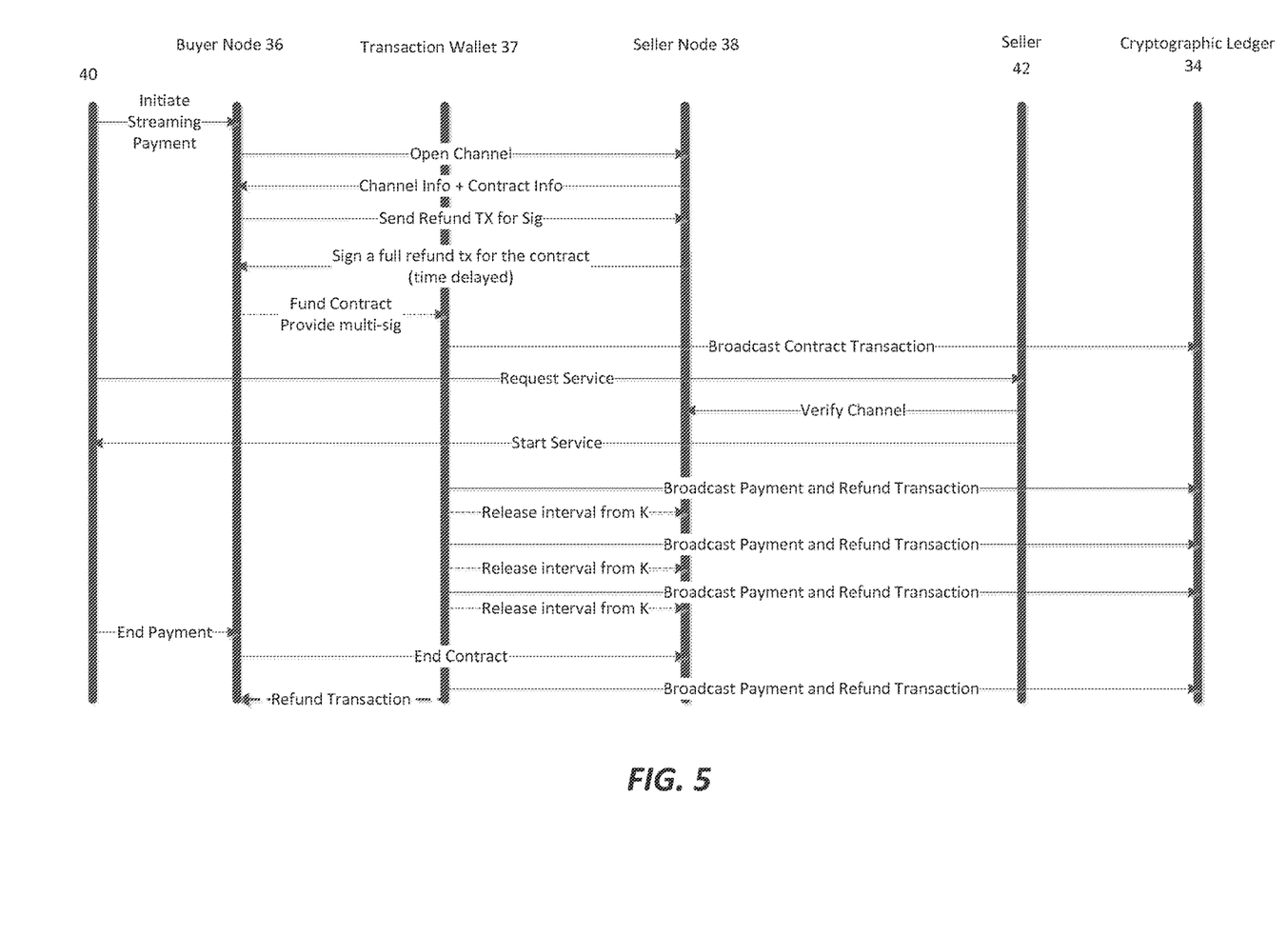
FIG. 5 is a time-entity flowchart depicting actions taken to perform real-time settlement of telecommunications channels as internally monitored, according to various embodiments.

FIG. 5 is a time-entity flowchart depicting actions taken to perform real-time settlement of telecommunications channels as internally monitored, according to various embodiments. A notable distinction included in FIG. 5 and not in FIG. 3 is a plurality of payment transactions from the transaction wallet 37 to the seller node 38 with respect to releasing funds from the contract fund.

Pass through indicates that no push or pull alert is required to determine whether or not the contract fund has sufficient remaining cryptocurrency to support the service of the channel 28. In some embodiments, pass through release additionally indicates that there is a transfer of cryptocurrency between wallets, and therefore each interval has a published record on the cryptographic ledger.

Figure 6:
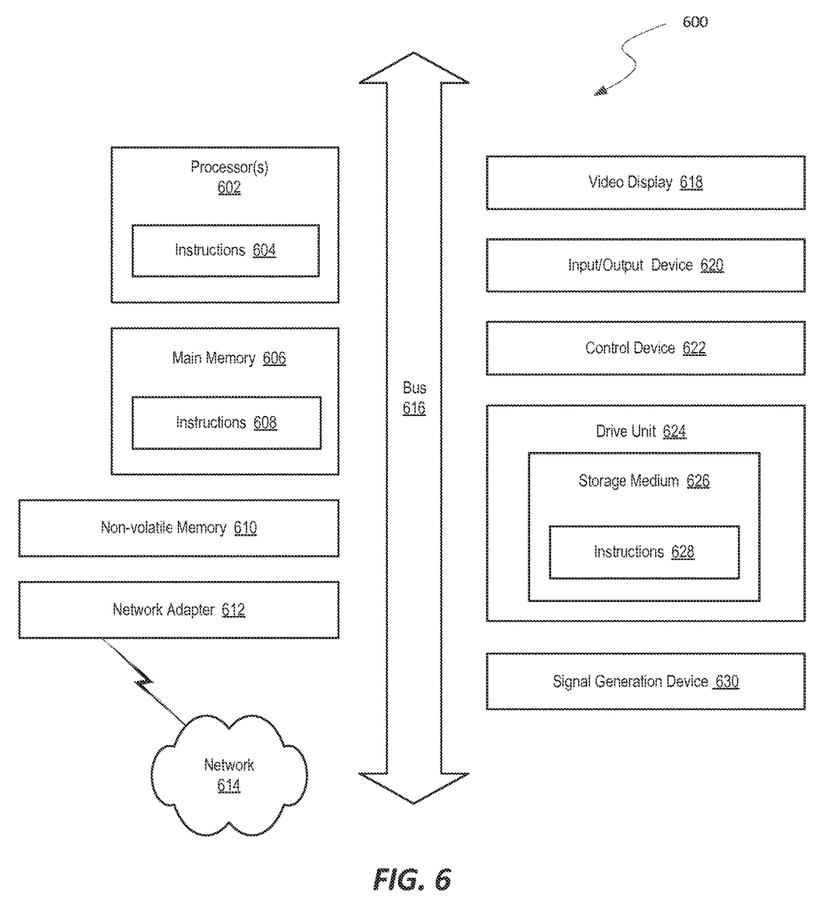
FIG. 6 is a block diagram illustrating an example of a computing system in which at least some operations described herein can be implemented.

FIG. 6 is a block diagram illustrating an example of a computing system 600 in which at least some operations described herein can be implemented. The computing system may include one or more central processing units ("processors") 602, main memory 606, non-volatile memory 610, network adapter 612 (e.g., network interfaces), video display 618, input/output devices 620, control device 622 (e.g., keyboard and pointing devices), drive unit 624 including a storage medium 626, and signal generation device 630 that are communicatively connected to a bus 616. The bus 616 is illustrated as an abstraction that represents any one or more separate physical buses, point to point connections, or both connected by appropriate bridges, adapters, or controllers. The bus 616, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 600 operates as a standalone device, although the computing system 600 may be connected (e.g., wired or wirelessly) to other machines. In a networked deployment, the computing system 600 may operate in the capacity of a server or a client machine in a client-server network environment, or as a peer machine in a peer-to-peer (or distributed) network environment.

The computing system 600 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 606, non-volatile memory 610, and storage medium 626 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 628. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 604, 608, 628) set at various times in various memory and storage devices in a computer, and that, when read and executed by one or more processing units or processors 1802, cause the computing system 600 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 610, floppy and other removable disks, hard disk drives, optical disks (e.g., Compact Disk Read-Only Memory (CD ROMS), Digital Versatile Disks, (DVDs), Blu-Ray disks), and transmission type media such as digital and analog communication links.

The network adapter 612 enables the computing system 600 to mediate data in a network 614 with an entity that is external to the computing device 600, through any known and/or convenient communications protocol supported by the computing system 600 and the external entity. The network adapter 612 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 612 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

The techniques introduced herein can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disk read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Cryptocurrency wallets are not physical wallets. Rather, the existence of a cryptocurrency wallet is evidenced by a public key or address. Transactions involving the cryptocurrency wallet are controlled by a private key. Variations on cryptocurrency wallets have multiple public addresses or keys, and multiple private keys. Some cryptocurrency wallets require multiple signatures in order to transact. Some require a quorum of private keys.

In order to determine the contents of a cryptocurrency wallet, one refers to a cryptographic ledger and sums up all transactions of the public address for that wallet. The summation of all transactions shows a balance for that wallet.

Having an association with a cryptocurrency wallet refers to ownership of the assets contained in the wallet. Ownership is most readily demonstrated by possession of one or more of the private keys for a given wallet; however, because remembering and using private keys is a cumbersome business, and owner of a wallet may not always possess the private key. Rather, an external service or provider may hold the private key for a wallet owner. The wallet owner uses alternative means to demonstrate familiarity and identification to the external service, and the external service holds the private key in the owner's name.

If an owner loses their private key, the assets of the cryptocurrency wallet are effectively destroyed as no one will ever be able to access the wallet. Accordingly, external holding services provide value. An imperfect analogy is a safety deposit box at a bank registered only by name rather than key containing the key for another safety deposit box that contains assets. Accordingly, despite traditional definitions of cryptocurrency wallet owner being tied to possession of the private key, this disclosure refers to ownership as equating to association with a cryptocurrency wallet and including circumstances where an external service holds a wallet's private key in the owner's name.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for managing telecommunications channels comprising:
   sending, by a buyer telecommunications server comprising at least one processor, to a channel monitor, a telecommunications channel opening request, the channel monitor comprising at least one processor and holding cryptographic wallets and corresponding private keys of both a buyer and a seller, the opening request providing an amount of cryptocurrency to the buyer cryptographic wallet;
   generating and signing with the buyer private key, by the channel monitor, a contract between the buyer and the seller, the contract including a channel usage rate per unit of time and a total contract amount;
   opening, by the buyer telecommunications server, the telecommunications channel with a seller telecommunications server;
   generating, by the channel monitor, a transaction wallet in response to the channel opening;
   transferring, by the channel monitor, cryptocurrency in the total contract amount from the buyer cryptocurrency wallet to the transaction wallet;
   publishing, by the channel monitor, the cryptocurrency transfer transaction on a cryptographic ledger;
   generating and signing with both the buyer and the seller cryptocurrency wallet private keys, by the channel monitor, an initial signed refund transaction, the initial signed refund transaction setting an automatic refund of the cryptocurrency in the total contract amount to the buyer cryptocurrency wallet at a contract expiration time;
   initiating, by a seller communications server comprising at least one processor, usage of the opened channel by establishing communications connections between users of the buyer telecommunications server to users of the seller telecommunications server;
   monitoring, by the channel monitor, the channel usage by progressively replacing previously signed transactions with at least one time-based transaction, the channel usage monitoring comprising:
      calculating, at a current time unit, a usage amount to be transferred to the seller cryptocurrency wallet and a remaining amount to be returned to the buyer cryptocurrency wallet based on the current time unit, the contract rate and total contract amount;
      generating a superseding time-based transaction comprising the calculated usage amount and remaining amount;
      signing the superseding time-based transaction with the buyer private key; and
      replacing all previously signed transactions with the superseding time-based transaction;
      repeating the steps of calculating, generating, signing and replacing at each subsequent time unit until a channel termination notice is received by the channel monitor;
   receiving, by the channel monitor, a channel termination notice from the buyer telecommunications server;
   in response to receiving the channel termination notice, terminating, by the channel monitor, the channel usage by:
      generating a final transaction signed by the buyer and seller private keys by signing, with the seller private key, the most recent buyer signed superseding time-based transaction;
      generating, by the channel monitor, a payment transaction by transferring the calculated usage amount of the final transaction from the transaction wallet to the seller cryptocurrency wallet;
      generating, by the channel monitor, a refund transaction by transferring the calculated remaining amount of the final transaction from the transaction wallet to the buyer cryptocurrency wallet; and
      publishing, by the channel monitor, both the payment and refund transactions on the cryptographic ledger.

2. The method of claim 1, wherein the monitoring step further comprises:
   before each step of repeating, sending, by the channel monitor, a message to the seller telecommunications server indicating that sufficient cryptocurrency is present at the current time unit in the buyer cryptocurrency wallet.

3. The method of claim 1, further comprising:
   receiving, by the channel monitor, from the seller telecommunications server at each time unit, a query to the sufficiency of cryptocurrency present in the buyer cryptocurrency wallet to pay for operation of the channel; and
   sending, by the channel monitor in response to the query, a message to the seller telecommunications server indicating that sufficient cryptocurrency is present at the current time unit in the buyer cryptocurrency wallet.

4. The method of claim 1, further comprising: encoding, by the channel monitor, the contract into a transaction on the cryptographic ledger.

5. The method of claim 1, wherein the total contract amount comprises an agreed upon retainer amount.

6. The method of claim 1, wherein the transaction wallet is a multi-signature wallet that requires two or more private keys to release funds.

* * * * *